(12) United States Patent
Borg et al.

(10) Patent No.: US 8,497,870 B2
(45) Date of Patent: Jul. 30, 2013

(54) COLOR MANAGEMENT DETECTION (75) Inventors: Lars U. Borg, Saratoga, CA (US); Ken Kameda, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1184 days.

(21) Appl. No.: 11/763,967

(22) Filed: Jun. 15, 2007

(65) Prior Publication Data

US 2013/0120432 A1    May 16, 2013

(51) Int. Cl.
*G09G 5/02* (2006.01)

(52) U.S. Cl.
USPC .......................................................... 345/589

(58) Field of Classification Search
USPC .......................................................... 345/647
See application file for complete search history.

(56) References Cited

U.S. PATENT DOCUMENTS

| 2002/0124027 A1* | 9/2002 | Krueger et al. | 707/528 |
| 2003/0071923 A1* | 4/2003 | Eskin | 348/674 |
| 2006/0082847 A1* | 4/2006 | Sugimoto | 358/518 |
| 2008/0204829 A1* | 8/2008 | Harrington | 358/504 |

OTHER PUBLICATIONS

"RAMDAC". Free On-Line Dictionary of Computing. Published on Mar. 24, 1996. Accessible at http://foldoc.org/ramdac.*
Borg, Lars, *Is Your System ICC Version 4 Ready?*, International Color Consortium, Nov. 2003, 2 pgs. http://www.color.org/version4html.html.

* cited by examiner

*Primary Examiner* — Aaron M Richer
(74) *Attorney, Agent, or Firm* — Wolfe-SBMC (57) ABSTRACT

The subject matter disclosed herein relates to enhancing the visual distinction between color managed image elements and non-color managed image elements.

30 Claims, 5 Drawing Sheets

COLOR MANAGEMENT DETECTION

BACKGROUND

Many devices represent colors of image elements to users for a variety of purposes. These purposes may typically include representing colors of image elements by a device on a display and/or in print. When a given device represents colors to a user, the device typically employs a color space to define each displayed and/or printed color numerically. The color space of a given device defines the total range of colors reproducible by that device. Typically, the color space of a given device does not encompass all possible colors and is therefore only a subset of all possible colors. As the color space of a given device is typically only a subset of all possible colors, different types of devices, different device models, and/or different manufactures may use varying color spaces.

It may be challenging to accurately represent each displayed and/or printed color numerically as color data in the device color space, so that the colors appear accurate to the eye of a user. For example, the transfer of color data from one device color space to another device color space may result in inaccurate color representation if the color spaces of the devices are not the same.

Color management often may be used to facilitate the transfer of color data from one device color space to another different device color space. Color management may typically be performed via a color management system (CMS), which may be used to reduce or eliminate color space matching problems and makes color portable. A CMS may reconcile the different color capabilities of scanners, monitors, and/or printers to ensure consistent color throughout the transfer of color data between various devices. For example, the colors displayed on a monitor may be accurately transferred to a printer. Similarly, color management may permit different applications, devices, and/or operating systems to display colors consistently.

Figure 1:
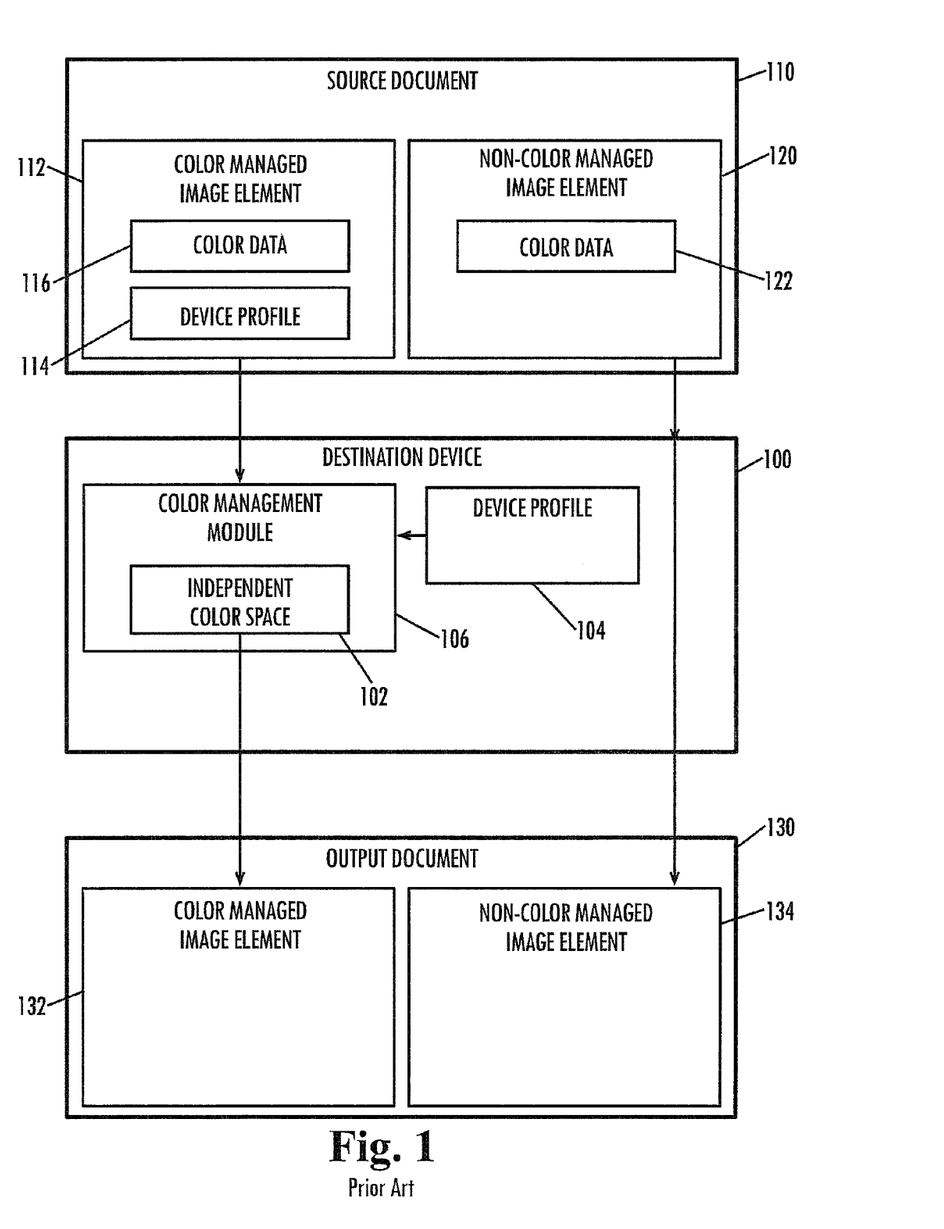
FIG. 1 is a schematic diagram illustrating a translation of image elements from a source document to an output document.

Referring to FIG. 1, destination device 100 may employ a color management system typically having three major components: a device-independent color space 102 that acts as a common reference for translating between different color spaces, device profiles 104 that define the color characteristics of one or more particular devices, and a Color Management Module (CMM) 106 that interprets the device profiles and carries out the translation of color data from one device color space to another different device color space.

Color management operations may translate color data from one device color space to another different device color space by the CMM 106 using various device profiles 104 and device independent color space 106. Each device profile 104 may define the color characteristics of the given device to allow for a translation between a first device color space into the device independent color space 102 via a first device profile, and from the device independent color space 102 into a second device color space via a second device profile. Accordingly, the device independent color space 102 may provide a device independent reference for transferring color data from one device profile to another different device profile.

While it may be useful to utilize color management operations, it is often not readily apparent if the color data of a particular image element is being processed by color management operations. For example, the color space of a typical operating system display may be very close, but not an exact match, with the color space of a typical Red-Green-Blue (RGB) document color space or of a typical RGB image color space. Where two or more color spaces match very closely, but not exactly, a user may or may not be able to discern if an image element is being properly color managed.

Additionally, multiple image elements may be included in a compound document, such as a source document 110. Often these multiple image elements may come from various sources and may or may not be color managed. For color managed image elements 112, the image elements may include an associated device profile 114 in addition to its color data 116. For example, the associated device profile 114 may be embedded into the color managed image element 112 itself. Embedded device profiles 114 allow users to transparently move color managed image elements 112 between different computers, networks and even operating systems without having to maintain or install the necessary device profiles 104 on the destination device. Additionally or alternatively, the color managed image element 112 may be associated with one of the device profiles 104 located on the destination device 100 through the CMM 106. Conversely, a non-color managed image element 120 may not have any associated device profile in addition to its color data 122. Accordingly, non-color managed image elements 120 transferred to a destination device 100 may not be presented with colors consistent with the intended color rendering. For example, the CMM 106 may take color managed image elements 112 in a source document 110 and translate their color data 116 from the source device color space to the destination device 100 color space via the device profile 104 and device profile 114. Color managed image elements 112 from source document 110 may be outputted as color managed image elements 132 in the output document 130 to be presented with colors consistent with the intended color rendering. However, non-color managed image elements 120 in a source document 110 may not be translated by the CMM 106. Accordingly, the color of the outputted non-color managed image elements 134 in the output document 130 may not be presented with colors consistent with the intended color rendering.

In some cases, a device profile may be altered to facilitate identification of color managed image elements. For example, a typical RGB device profile may be modified to permute a device profile to a Green-Blue-Red (GBR) device profile. See Is Your System ICC Version 4 Ready?, retrieved Apr. 10, 2007, from the International Color Consortium website: http://www.color.org/version4html.html. In a modified GBR device profile, the color of the displayed and/or printed image elements may appear distorted if the image elements are color managed by the modified GBR device profile. Additionally, in the modified GBR device profile the color of the displayed and/or printed image elements may not appear distorted if the image elements are not color managed by the modified GBR device profile. As a result, color managed image elements may appear distorted while the non-color managed image elements may not appear distorted

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, for example, may result in an embodiment of a method in accordance with claimed subject matter being executed, for example. In the following description and/or claims, the terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

In the following description and/or claims, the term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. However, these are merely examples of an instruction, and the scope of claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining, displaying, sorting, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

In the following description and/or claims, the term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the following description and/or claims, the term "image element" as referred to herein relates to an object and/or information that is organized and/or formatted in a digitized form for printing or for displaying in a graphical user interface. For example, an image element may be organized and/or formatted in a digitized form comprising one or more of the following formats: jpeg, tiff, pdf, psd, and/or the like, or combinations thereof. However, these are merely examples of image element formats, and the scope of claimed subject matter is not limited in this respect. One or more image elements may be included in a document for applications such as graphic design video editing, photo editing, and the like. For example, an image element may comprise one or more of the following: a shape, a picture, an image, text, a text box, a virtual widget, a virtual control object, a virtual interface component, a virtual window, a virtual desktop, a virtual button, a virtual check box, a virtual menu, a virtual icon, a virtual toolbar, a virtual scroll bar, and/or the like, or combinations thereof. However, these are merely examples of image elements, and the scope of claimed subject matter is not limited in this respect.

In the following description and/or claims, the term "color managed" as referred to herein relates to the management of the transfer of color data from one device color space to another different device color space. For example, the color space of a given device defines the total range of colors reproducible by that device. Typically, the color space of a given device does not encompass all possible colors and is therefore only a subset of all possible colors. As the color space of a given device is typically only a subset of all possible colors, different types of devices (such as printers, displays, scanners, or the like), different device models, and/or different manufactures may use varying color spaces. For example, color management may translate color data from one device color space to another different device color space by using device profiles and a device independent color space. Color spaces may include but are not limited to the following: sRGB, Adobe RGB and Adobe Wide Gamut RGB, CMYK, CIE 1931 XYZ, CIELUV, CIELAB, CIE 1964, or the like. The device independent color space may provide a device independent reference for transferring color data from one device profile to another different device profile. Each device profile may define the color characteristics of the given device to allow for a translation between a first device color space into the device independent color space via a first device profile, and from the device independent color space into a second device color space via a second device profile. Alternatively, it is not required to convert color data to and from an intermediate color space. For example, a translation between a first device color space into a second device color space may instead be accomplished by combining the transforms into one. However, these are merely examples of translations between color spaces, and the scope of claimed subject matter is not limited in this respect.

In the following description and/or claims, the term "non-color managed" as referred to herein relates to the lack of management of the transfer of color data from one device color space to another different device color space. For example, color management may not occur for an image element that does not have an associated device profile either embedded in the image element and/or does not have an associated device profile located on the destination device, rendering the image element a "non-color managed image element". Additionally or alternatively, color management may not occur for an image element, regardless of the presence or absence of device profiles, where a system and/or application fail to implement or utilize a CMS. For example, many web browsers ignore embedded profiles in image elements and display all contents as non-color managed.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one particular example, although claimed subject matter is not limited in this respect, a visual distinction between color managed image elements and non-color managed image elements in an output document may be created and/or enhanced to facilitate identification of any non-color managed image elements in an output document. In this context, a device gamma table of a destination device may be altered to distort the appearance of non-color managed image elements in an output document. For example, a device gamma table of a destination device comprises one or more of the following: a system gamma table of a printer (such as a dotgain curve or a transfer curve for example), a display gamma table, a video card gamma table, and/or the like, or combinations thereof. However, these are merely examples of device gamma tables, and the scope of claimed subject matter is not limited in this respect. In order to prevent color managed image elements in an output document from also appearing distorted, an inverse distortion may be applied to the color managed image elements through inversely altered gamma values from a device profile used during operations by a color management module. As used herein, the term "inverse distortion," "inversely distorting," and the like, refer to counteracting an additional preceding or subsequent distortion applied to color data of color managed image elements to eliminate the effects of the additional preceding or subsequent distortion to the color data of color managed image elements.

Figure 2:
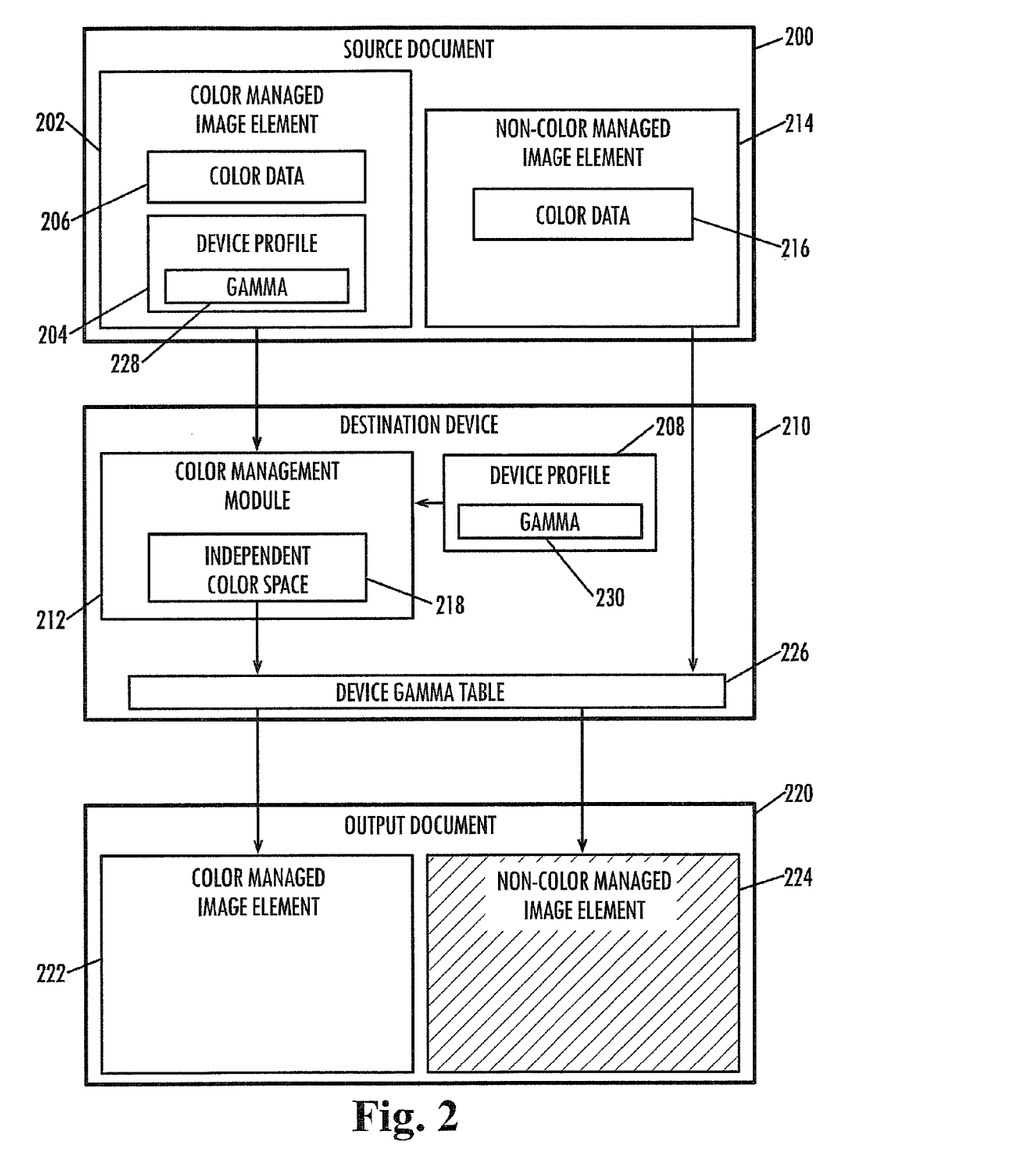
FIG. 2 is a schematic diagram illustrating a translation of image elements from a source document to an output document in accordance with one or more embodiments.

Referring to FIG. 2, a schematic diagram illustrates a translation of image elements from a source document to an output document in accordance with one or more embodiments. Multiple image elements may be included in a compound document, such as a source document 200. These multiple image elements may come from various sources and may or may not be color managed. For color managed image elements 202, the image elements may include an associated device profile 204 in addition to its color data 206. For example, the associated device profile 204 may be embedded into the color managed image element 202 itself. Embedded device profiles 204 allow users to transparently move color managed image elements 202 between different computers, networks and even operating systems without having to maintain or install the necessary device profiles on the destination device. Additionally or alternatively, the color managed image element 202 may have an associated device profile 208 located on a destination device 210 and associated with the color managed image element 202 through a Color Management Module (CMM) 212. Conversely, a non-color managed image element 214 may not have any associated device profile in addition to its color data 216. Accordingly, non-color managed image elements 214 transferred to a destination device 210 may not be presented with colors consistent with the intended color rendering.

Destination device 210 may employ a color management system for managing color content. For example, the color management system may include three major components: a device-independent color space 218 that acts as a common reference for translating between different color spaces, one or more device profiles 208 that define the color characteristics of one or more particular devices, and Color Management Module (CMM) 212 that interprets device profiles and carries out the translation of color data from one device color space to another different device color space.

Color management operations may translate color data from one device color space to another different device color space by the CMM 212 using various device profiles 204 and/or 208 and device independent color space 218. Each device profile 204 and/or 208 may define the color characteristics of the given device to allow for a translation between a first device color space into the device independent color space 218 via a first device profile associated with the source document 200. Likewise, each device profile 208 may define the color characteristics of the given device to allow for a translation from the device independent color space 218 into a second device color space via a second device profile associated with the destination device 210. Accordingly, the device independent color space 218 may provide a device independent reference for transferring color data from one device profile to another different device profile. Alternatively, it is not required to convert color data to and from an intermediate color space 218. For example, a translation between a first device color space into a second device color space may instead be accomplished by the CMM 212 using various device profiles 204 and/or 208 combined into a single transform.

An output document 220 may be generated by the destination device 210 based on the source document 200. Output document 220 may include color managed image elements 222 based on the color managed image elements 202 of the source document 200 and/or non-color managed image elements 224 based on the non-color managed image elements 214 of the source document 200. A visual distinction between color managed image elements 222 and non-color managed image elements 224 in output document 220 may be created and/or enhanced to facilitate identification of any non-color managed image elements 224 in output document 220. In this context, a device gamma table 226 of a destination device 210 may be altered to distort the appearance of non-color managed image elements 224 in output document 220. In order to prevent color managed image elements 222 in output document 220 from also appearing distorted, an inverse distortion may be applied to the color managed image elements 222 through inversely altered gamma values 230 associated with device profile 208 used during operations by a color management module 212.

For example, with altered gamma values 230, CMM 212 may take color managed image elements 202 from source document 200 and translate their color data 206 from the source device color space to the destination device 210 color space and apply the altered gamma values 230 during the translation. Through use of the altered gamma values 230, color managed image elements 202 from source document 200 may be outputted as with inversely distorted color data.

Accordingly, with non-color managed image elements 224 of output document 220 being formatted based on altered device gamma table 226, the color of the outputted non-color managed image elements 224 in the output document 220 may appear distorted. Conversely, with color managed image elements 222 of output document 220 being formatted based on altered gamma values 230 as well as based on altered device gamma table 226, the color of the outputted color managed image elements 222 in the output document 220 may not appear distorted. As a result, color managed image elements 222 may appear normal while the non-color managed image elements 224 may appear distorted.

Figure 3:
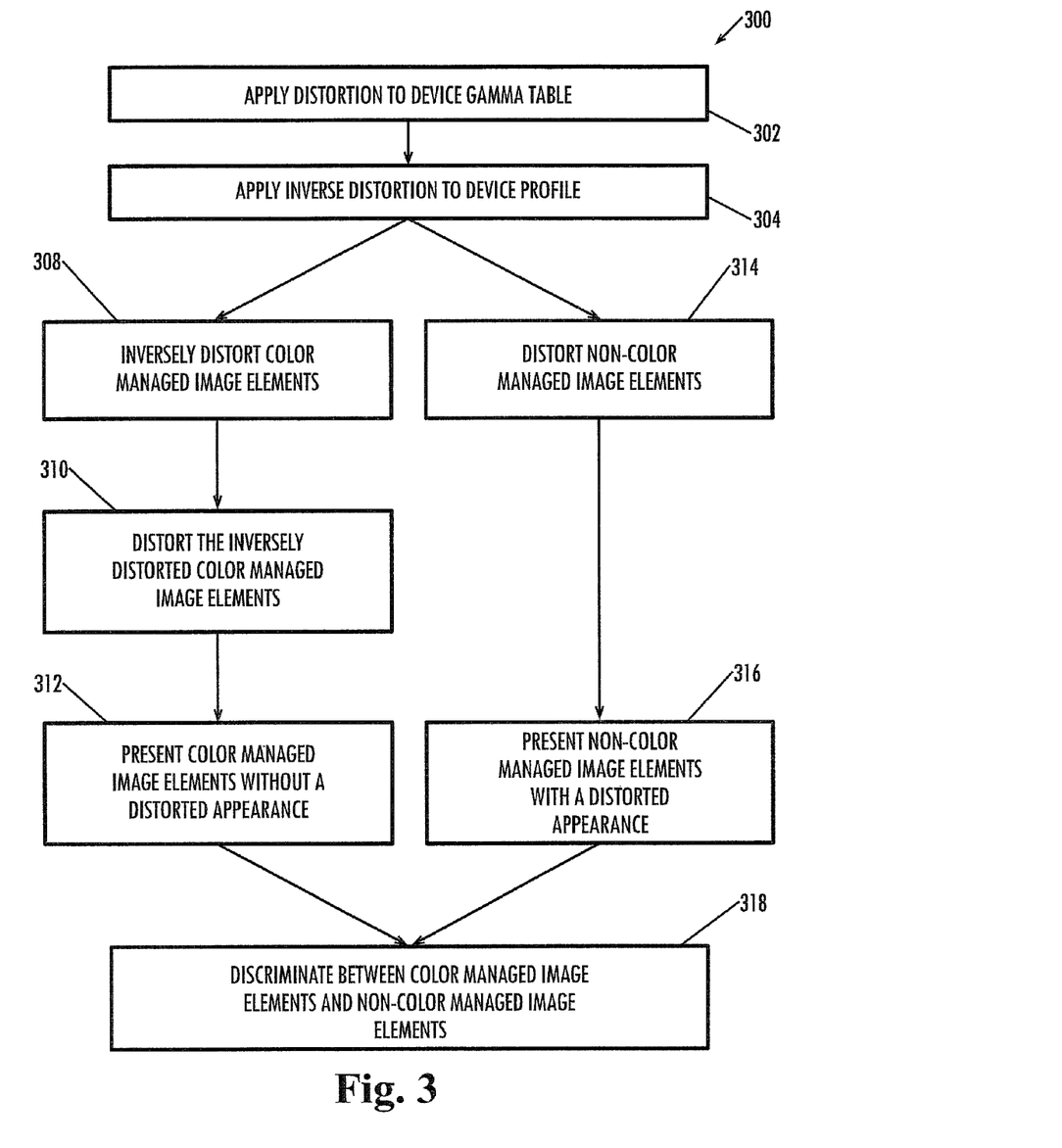
FIG. 3 is a flow diagram illustrating a procedure for enhancing the visual distinction between color managed image elements and non-color managed image elements in accordance with one or more embodiments.

Referring to FIG. 3, a flow diagram illustrates an example procedure in accordance with one or more embodiments, although the scope of claimed subject matter is not limited in this respect. Procedure 300 illustrated in FIG. 3 may be used to enhance the visual distinction between color managed image elements and non-color managed image elements, for example, although the scope of claimed subject matter is not limited in this respect. Additionally, although procedure 300, as shown in FIG. 3, comprises one particular order of blocks, the order in which the blocks are presented does not necessarily limit claimed subject matter to any particular order. Likewise, intervening blocks shown in FIG. 3 and/or additional blocks not shown in FIG. 3 may be employed and/or blocks shown in FIG. 3 may be eliminated, without departing from the scope of claimed subject matter.

Figure 4A:
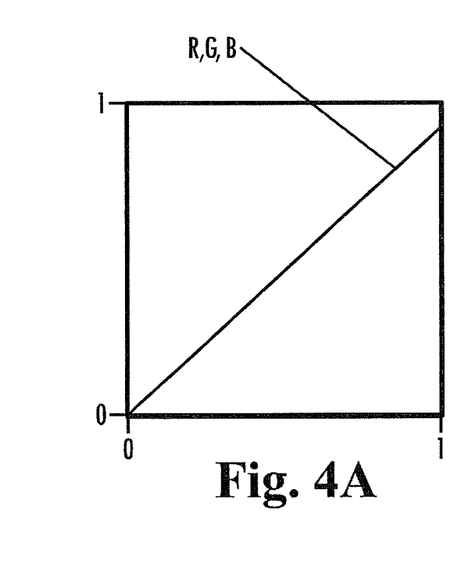
FIGS. 4A-4C are graphic diagrams illustrating various gamma tables in accordance with one or more embodiments.

Procedure 300 depicted in FIG. 3 may in alternative embodiments be implemented in software, hardware, and/or firmware, and may comprise discrete operations. As illustrated, procedure 300 starts at block 302 where a distortion may be applied to device gamma table of a destination device, such as a video card gamma table. The distorted device gamma table may be utilized to distort non-color managed image elements in order to enhance and/or create a visual distinction between color managed image elements and non-color managed image elements, as mentioned above. In general, gamma adjustments are transformations that adjust for the non-linear nature of color intensity. Gamma adjustments are used to correct for the variance between the magnitude of an increase or decrease in the power of a color signal and the lesser magnitude of the effect on the human visual system. A typical gamma curve with red gamma values R, green gamma values G, and blue gamma values B running an entire color gamut from a black coordinate of 0, 0 to a white coordinate of 1, 1 is illustrated in FIG. 4A.

Figure 4B:
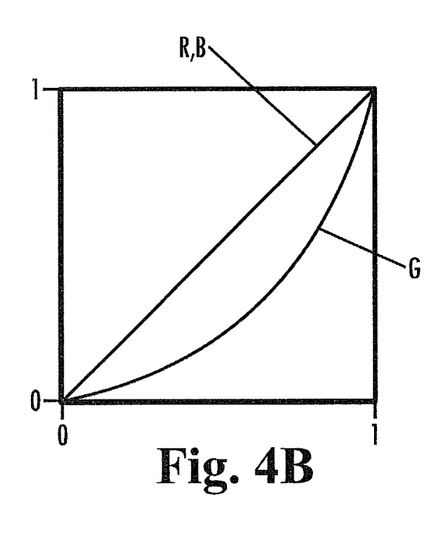

Referring to FIG. 4B, the distorted device gamma table may include a distortion curve that is capable of being invertible, so that a combination of the distortion curve with an inverted distortion curve may result in no distortion. For example, the distorted device gamma table may include an asymmetric distortion curve of red gamma values R, green gamma values G, and/or blue gamma values B, or combinations thereof, although the scope of claimed subject matter is not limited in this respect. Additionally or alternatively, the distortion curve may comprise one or more of the following: an inverted curve (such as a curve with a function of f'=1−f), a non-monotonic curve (such as ABS (2x−1) or SIN(x PI)), and/or the like, or combinations thereof. However, these are merely examples of distortion curves, and the scope of claimed subject matter is not limited in this respect. Application of such a distortion curve may cause displayed and/or printed image elements to appear altered, incorrect, and/or weird to the eye. For example, the distortion curve of gamma values may use three gamma curves with gamma values of 1, ⅓, 1 for red gamma values R, green gamma values G, and blue gamma values B, respectively, resulting in shifting a typical mid-gray RGB 128, 128, 128 color data of an image element to a magenta shade of RGB 128, 32, 128 color data. While the device gamma table curves are typically stored in a video card, the device gamma table curves may alternatively or additionally be stored in a device profile.

Referring back to FIG. 3, the distorted device gamma table may also distort the color managed image elements. At block 304, an inverse distortion may be applied to a device profile. The inverse distortion applied to the device profile may be utilized to cancel out the effect of the distorted device gamma table.

Figure 4C:
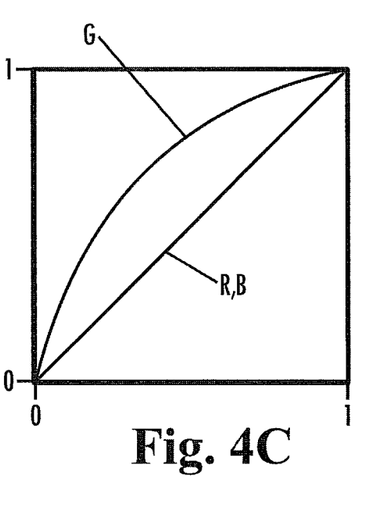

Referring to FIG. 4C, likewise, the inversely distorted gamma table associated with the color managed image elements may include a distortion curve of red gamma values R, green gamma values G, and/or blue gamma values B, or combinations thereof, although the scope of claimed subject matter is not limited in this respect. The nature of the inversely distorted gamma table associated with the color managed image elements may counteract the altered device gamma table curves to prevent the color managed image elements from being displayed and/or printed image elements to appear altered, incorrect, and/or weird to the eye. For example, the inversely distorted gamma table associated with the color managed image elements may use three gamma curves with gamma values of 1, 3, 1 for red gamma values R, green gamma values G, and blue gamma values B, respectively, resulting in shifting the distorted magenta shade of RGB 128, 32, 128 color data to a typical mid-gray RGB 128, 128, 128 color data. While the distorted gamma table associated with the color managed image elements are typically stored in a device profile located on the destination device, the inversely distorted gamma table may alternatively or additionally be stored in an embedded device profile associated with the color managed image element.

Referring back to FIG. 3, for example, the inversely distorted curves of the device profile may be based on the distorted device gamma table curves. Where the distortion curve of the device gamma table is monotonic, such as where each successive value along the distortion curve is greater than or equal to the preceding member, an inverse distortion may be determined over an entire color gamut from a black coordinate of 0, 0 to a white coordinate of 1, 1. Where the distortion curve of the device gamma table is either monotonic or non-monotonic, the inverse distortion curve of the device profile may combine with the distortion curve to result in a straight line canceling out the effect of the distortion curve.

As discussed above, color management involves the matching of colors from a source device to another destination device. The color managed image element from a source document may have an associated color space based on the nature of the source device. In order to accurately access the color managed image element via the destination device, the color data of the color managed image element may be transformed into the color space of the destination device. This is a two-step process with an input stage and an output stage. In the input stage, first the color data of the color managed image element may be transformed into a device-independent color space, using a device profile associated with the color managed image element that describes the color behavior of the source device. In the output stage, the data in device-independent color space may then be transformed into the color space of the destination device using a device profile associated with the destination device, which describes the color behavior of the destination device. For example, the inverted distortion may be applied to the color managed image element during transformation of the color data of the color managed image elements into device dependent color data either at the input stage or the output stage of the two-step process of color management. The inverted distortion may be applied at an input stage during translation between a first device color space into a device independent color space via a first device profile. For example, the inverted distortion applied by the device profile may be applied at an input stage when converting from an encoded RGB color space to a linear RGB color space and/or when converting from an encoded RGB color space to a XYZ color space. Alternatively or additionally, the inverted distortion may be applied at an output stage during translation between the device independent color space into a second device color space via a second device profile. For example, the inverted distortion applied by the device profile may be applied at an output stage when converting from linear RGB color space to encoded RGB color space and/or when converting from XYZ color space to encoded RGB color space, such as, where the device profile caries a separate XYZ color space to RGB color space transformation.

In one example, we can apply a process in a computing platform where after alteration of a device profile and device gamma tables, altered device profile and device gamma tables may be installed. A reboot of the computing platform may facilitate activation of the altered device profile and device gamma tables. Image elements may then be printed and/or displayed with a visual distinction between color managed image elements and non-color managed image elements, as will be described in greater detail below. In one or more embodiments, the image elements may be printed and/or displayed via a software program such as Adobe® Creative® Suite® type software, Adobe® Premiere® Pro 2.0 type software, Adobe® Premiere® Elements type software, or Adobe® Acrobat® type software, or the like, available from Adobe Systems Incorporated of San Jose, Calif., USA. However, these are merely example types of software programs, and the scope of claimed subject matter is not limited in these respects.

A visual distinction between color managed image elements and non-color managed image elements may be created and/or enhanced based on the application of the distorted device gamma table curves and the application of the inversely distorted curves of the device profile. For example, the color managed image elements may not appear distorted thereby enhancing and/or creating a visual distinction between color managed image elements and non-color managed image elements. For example, at block 308, color data of the color managed image elements may be inversely distorted into inversely distorted color data. The inverse distortion may be utilized to cancel out the effect of the distorted device gamma table. The inversely distorted color data may be formed based, at least in part, on the inverted distortion applied by the device profile during transformation of the color data of the color managed image elements into device dependent color data. For example, the device profile may apply the inverted distortion at an input stage during translation between a first device color space into a device independent color space via a first device profile. Alternatively or additionally, the device profile may apply the inverted distortion at an output stage during translation between the device independent color space into a second device color space via a second device profile.

At block 310, the inversely distorted device dependent color data of the color managed image elements may be distorted to produce non-distorted device dependent color data. The non-distorted device dependent color data may be formed based, at least in part, on a distorted device gamma table applied to the inversely distorted device dependent color data. The inverse distortion from the display profile and the distortion from the device gamma table may cancel each other out to produce non-distorted device dependent color data, as illustrated above with respect to FIGS. 4B and 4C. At block 312, the color managed image elements may be presented without a distorted appearance via the non-distorted device dependent color data. For example, the color managed image elements may be rendered on a video display and/or printed as image elements to appear correct to an observer. The video display may include, but is not limited to: a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

The non-color managed image elements may be distorted in order to enhance and/or create a visual distinction between color managed image elements and non-color managed image elements. For example, at block 314, color data of the non-color managed image elements may be distorted into distorted color data. The distorted color data may be formed based, at least in part, on a distorted device gamma table applied to the color data. As described above, the distorted device gamma table may include an asymmetric distortion curve of red gamma values, green gamma values, and/or blue gamma values, or combinations thereof, although the scope of claimed subject matter is not limited in this respect. At block 316, non-color managed image elements may be presented with a distorted appearance. For example, the asymmetric nature of the distortion may cause image elements rendered on a video display and/or printed image elements of the non-color managed image elements to appear altered, incorrect, and/or weird to the eye based on the distorted color data.

The coordinated changes in both the device gamma table and the device profile may leave color managed image elements unchanged while altering the appearance of non-color managed image elements. Detection and/or correction of the non-color managed image elements may be facilitated by the enhanced and/or created visual distinction between color managed image elements and non-color managed image elements. For example, at block 318, an observer may discriminate between color managed image elements and non-color managed image elements based, at least in part, on the distorted appearance of non-color managed image elements. For example, as described above in greater detail, the alteration of the device gamma table may distort both non-color managed image elements as well as color managed image elements. The color managed image elements may be presented without a distorted appearance by altering the device profile in an inverse relation to the alteration to the device gamma table to cancel out the distortion from the altered device gamma table. As a result, color managed image elements may appear without a distorted appearance while non-color managed image elements may appear with a distorted appearance. As the appearance to the non-color managed image elements may be radically altered, color managed image elements may be discriminated from non-color managed image elements based, at least in part, on the distorted appearance of non-color managed image elements.

Figure 5:
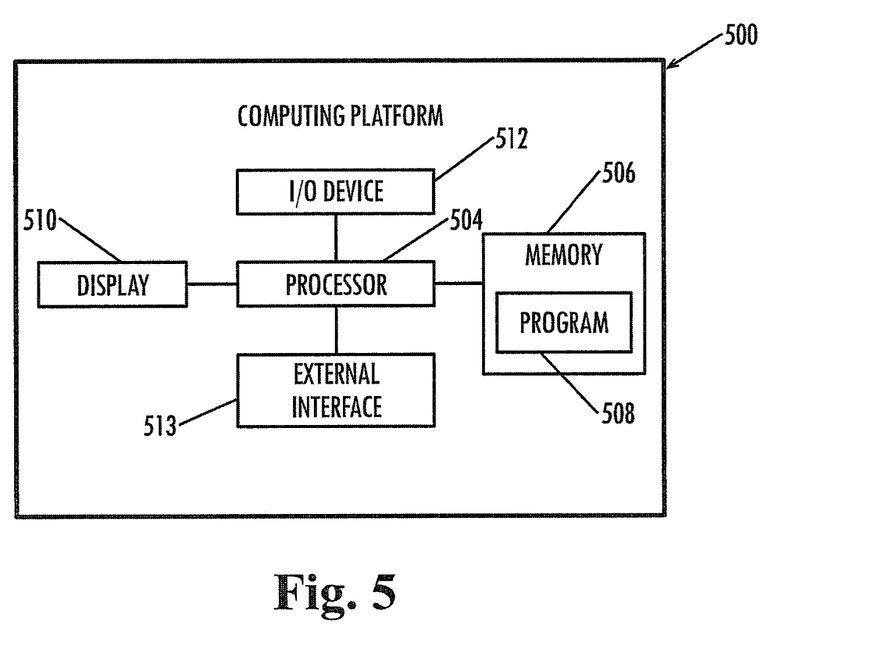
FIG. 5 is a schematic diagram of a computing platform in accordance with one or more embodiments.

Referring to FIG. 5, a block diagram illustrates a computing platform 500 according to one or more embodiments, although the scope of claimed subject matter is not limited in this respect. Computing platform 500 may include more and/or fewer components than those shown in FIG. 5. However, generally conventional components may not be shown, for example, a battery, a bus, and so on.

Computing platform 500, as shown in FIG. 5 may be utilized to tangibly embody a computer program and/or graphical user interface by providing hardware components on which the computer program and/or graphical user interface may be executed. Computing platform 500 may be utilized to tangibly embody all or a portion of procedure 100 of FIG. 1 and/or procedure 200 of FIG. 2. Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 5, computing platform 500 may be controlled by processor 504, including one or more auxiliary processors (not shown). Processor 504 may comprise a central processing unit such as a microprocessor or microcontroller for executing programs, performing data manipulations, and controlling the tasks of computing platform 500. Auxiliary processors may manage input/output, perform floating point mathematical operations, manage digital signals, perform fast execution of signal processing algorithms, operate as a back-end processor and/or a slave-type processor subordinate to processor 504, operate as an additional microprocessor and/or controller for dual and/or multiple processor systems, and/or operate as a coprocessor and/or additional processor. Such auxiliary processors may be discrete processors and/or may be arranged in the same package as processor 504, for example, in a multicore and/or multithreaded processor; however, the scope of claimed subject matter is not limited in these respects.

Communication with processor 504 may be implemented via a bus (not shown) for transferring information among the components of computing platform 500. A bus may include a data channel for facilitating information transfer between storage and other peripheral components of computing platform 500. A bus further may provide a set of signals utilized for communication with processor 504, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of claimed subject matter is not limited in this respect.

Other components of computing platform 500 may include, for example, memory 506, including one or more auxiliary memories (not shown). Memory 506 may provide storage of instructions and data for one or more programs 508 to be executed by processor 504, such as all or a portion of procedure 100 of FIG. 1 and/or procedure 300 of FIG. 3, for example. Memory 506 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 506 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 506 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 500 further may include a display 510. Display 510 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 510 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 500 further may include one or more I/O devices 512. I/O device 512 may comprise one or more I/O devices 512 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 500 further may include an external interface 514. External interface 514 may comprise one or more controllers and/or adapters to prove interface functions between multiple I/O devices 512. For example, external interface 514 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices 512.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
 receiving, by a computer, a source document comprising one or more color-managed image elements and one or more non-color-managed image elements, in which:
  each of the one or more color-managed image elements is an object located within the source document that is associated with a respective device profile for color management; and
  each of the one or more non-color-managed image elements is not associated with a device profile for color management;
 applying, by the computer, a distortion to the one or more color-managed image elements and to the one or more non-color-managed image elements;
 applying, by the computer, an inverse of the distortion to the one or more color-managed image elements using the respective device profile for each of the one or more color-managed image elements; and
 responsive to applying the distortion and applying the inverse of the distortion, presenting the one or more color-managed image elements undistorted in one portion of a display while presenting, separately in another portion of the display, the one or more non-color-managed image elements with a distorted appearance relative to the presented one or more color-managed image elements.

2. The method of claim 1, further comprising discriminating between the one or more color managed image elements and the one or more non-color managed image elements based, at least in part, on the distorted appearance of the one or more non-color managed image elements.

3. The method of claim 1, wherein the presenting enhances a visual distinction between the one or more color managed image elements and the one or more non-color managed image elements.

4. The method of claim 1, wherein applying the distortion to the one or more color-managed image elements and to the one or more non-color-managed image elements comprises distorting color data of the one or more color-managed image elements and the one or more non-color-managed image elements into distorted color data based, at least in part, on a distorted device gamma table.

5. The method of claim 4, wherein the distorted device gamma table comprises an asymmetric distortion curve of one or more of red, green, and blue gamma values.

6. The method of claim 1, further comprising printing the presented one or more color managed image elements and the presented one or more non-color managed image elements.

7. The method of claim 1, wherein:
applying the inverse of the distortion comprises inversely distorting color data of the one or more color managed image elements into inversely distorted color data; and
applying the distortion comprises distorting the inversely distorted color data of the one or more color managed image elements into non-distorted color data.

8. The method of claim 1, wherein:
applying the inverse of the distortion comprises inversely distorting color data of the one or more color managed image elements into inversely distorted device dependent color data based, at least in part, on an inverted distortion applied by the respective device profile for color management; and
applying the distortion comprises distorting the inversely distorted device dependent color data of the one or more color managed image elements into non-distorted device dependent color data based, at least in part, on a distorted video card gamma table.

9. The method of claim 1, wherein:
applying the inverse of the distortion comprises inversely distorting color data of the one or more color managed image elements into inversely distorted device dependent color data based, at least in part, on an inverted distortion applied by the respective device profile for color management; and
applying the distortion comprises:
distorting the inversely distorted device dependent color data of the one or more color managed image elements into non-distorted device dependent color data based, at least in part, on a distorted video card gamma table; and
distorting color data of the one or more non-color managed image elements into distorted color data based, at least in part, on the distorted video card gamma table.

10. One or more computer readable storage memories encoded with computer-executable instructions that, responsive to execution, configure a computer system to perform operations comprising:
receiving, at a device, a source document comprising one or more color-managed image elements and one or more non-color-managed image elements;
applying a distortion to a gamma table associated with the device;
applying an inverse distortion to a device profile of the device;
inversely distorting color data of the one or more color-managed image elements based on the inverse distortion applied to the device profile;
producing non-distorted color data of the one or more color-managed image elements by applying the distorted gamma table to the one or more color-managed image elements;
producing distorted color data of the one or more non-color-managed image elements by applying the distorted gamma table to the one or more non-color-managed image elements; and presenting the one or more color-managed image elements while presenting the one or more non-color-managed image elements based, at least in part, on the non-distorted color data of the one or more color-managed image elements and the distorted color data of the one or more non-color-managed image elements.

11. The one or more computer readable storage memories of claim 10, wherein presenting the one or more non-color managed image elements comprises enhancing a visual distinction between the one or more color managed image elements and the one or more non-color managed image elements.

12. The one or more computer readable storage memories of claim 10, wherein the distorted gamma table comprises an asymmetric distortion curve of one or more of red, green, and blue gamma values.

13. The one or more computer readable storage memories of claim 10, wherein presenting the one or more color managed image elements and the one or more non-color managed image elements comprises rendering the one or more color managed image elements and the one or more non-color managed image elements on a video display.

14. The one or more computer readable storage memories of claim 10, wherein presenting the one or more color managed image elements and the one or more non-color managed image elements comprises printing the one or more color managed image elements and the one or more non-color managed image elements.

15. The one or more computer readable storage memories of claim 10, wherein:
applying the inverse distortion to the device profile of the device comprises applying inversely altered gamma values to the device profile of the device; and
applying the distortion to the gamma table associated with the device comprises distorting a curve of the gamma table.

16. The one or more computer readable storage memories of claim 10, wherein the distorted device gamma table comprises a non-monotonic curve.

17. The one or more computer readable storage memories of claim 10, wherein the distorted gamma table comprises two or more distortion curves each including two or more gamma values.

18. The one or more computer readable storage memories of claim 10, the operations further comprising storing the distorted gamma table in the device profile of the device.

19. The one or more computer readable storage memories of claim 10, the operations further comprising storing the distorted gamma table in a video card.

20. An apparatus, comprising:
a processor; and
a memory coupled to the processor, wherein the memory stores program instructions for:
receiving, at a device, a source document comprising one or more color-managed image elements and one or more non-color-managed image elements
applying a distortion to a gamma table associated with the device;
applying an inverse distortion to a device profile of the device;
inversely distorting color data of the one or more color-managed image elements based on the inverse distortion applied to the device profile;
producing undistorted color data of the one or more color-managed image elements by applying the distorted gamma table to the one or more color-managed image elements;

producing distorted color data of the one or more non-color-managed image elements by applying the distorted gamma table to the one or more non-color-managed image elements; and presenting, based at least in part on the non-distorted color data and the distorted color data, a representation of the one or more color-managed image elements while presenting a representation of the one or more non-color-managed image elements.

21. The apparatus of claim 20, wherein applying the distortion to the gamma table associated with the device comprises distorting an asymmetric curve, an inverted curve, or a non-monotonic curve included in the gamma table.

22. The apparatus of claim 20, wherein:
applying the inverse distortion to the device profile of the device comprises applying inversely altered gamma values to the device profile of the device.

23. The apparatus of claim 20, wherein presenting the representation of the one or more non-color managed image elements comprises enhancing a visual distinction between the representation of the one or more color managed image elements and the representation of the one or more non-color managed image elements.

24. The apparatus of claim 20, wherein the device profile is embedded within a corresponding one of the one or more color managed image elements.

25. The apparatus of claim 20, wherein the distorted device gamma table comprises an asymmetric distortion curve of one or more of red, green, and blue gamma values.

26. The apparatus of claim 20, wherein presenting the representation of the one or more color managed image elements and the representation of the one or more non-color managed image elements comprises rendering the representation of the one or more color managed image elements and the representation of the one or more non-color managed image elements on a video display.

27. The apparatus of claim 20, wherein presenting the representation of the one or more color managed image elements and the representation of the one or more non-color managed image elements comprises printing the representation of the one or more color managed image elements and the representation of the one or more non-color managed image elements.

28. The apparatus of claim 20, wherein the device profile is stored on the device and the device performs the presenting.

29. The apparatus of claim 20, the memory further storing program instructions for correcting the distorted color data of the one or more non-color-managed image elements.

30. The apparatus of claim 20, the memory further storing program instructions for outputting the inversely distorting color data of the one or more color-managed image elements to a destination device.

* * * * *